US006087434A

United States Patent [19]

Hisashi et al.

[11] Patent Number: 6,087,434

[45] Date of Patent: Jul. 11, 2000

[54] PIGMENT COMPOSITION FOR LIQUID TONER

[75] Inventors: Hideyuki Hisashi; Akihiro Matsuki, both of Chigasaki; Yasuharu Suda, Hiroshima; Hiroaki Kuno, Hiroshima; Katsuaki Makino, Hiroshima, all of Japan

[73] Assignees: Mitsubishi Chemical Corporation; Mitsubishi Heavy Industries Ltd., both of Tokyo, Japan

[21] Appl. No.: 09/011,982

[22] PCT Filed: Jun. 19, 1997

[86] PCT No.: PCT/JP97/02114

§ 371 Date: Aug. 14, 1998

§ 102(e) Date: Aug. 14, 1998

[87] PCT Pub. No.: WO97/49007

PCT Pub. Date: Dec. 24, 1997

[30] Foreign Application Priority Data

| | | | |
|---|---|---|---|
| Jun. 20, 1996 | [JP] | Japan | 8-159610 |
| Jun. 20, 1996 | [JP] | Japan | 8-159612 |
| Jun. 20, 1996 | [JP] | Japan | 8-159615 |
| Jun. 20, 1996 | [JP] | Japan | 8-159616 |
| Jun. 20, 1996 | [JP] | Japan | 8-159617 |
| Jun. 21, 1996 | [JP] | Japan | 8-161613 |

[51] Int. Cl.$^7$ .................... C08K 3/04

[52] U.S. Cl. .................... 524/495; 106/472; 106/478

[58] Field of Search .................... 106/478, 472; 524/495; 523/215

[56] References Cited

U.S. PATENT DOCUMENTS

| | | | |
|---|---|---|---|
| 3,959,008 | 5/1976 | Warner et al. | 106/472 |
| 3,988,478 | 10/1976 | Wiggins | 106/472 |
| 4,435,378 | 3/1984 | Reck et al. | 423/445 |
| 5,973,059 | 10/1999 | Yamazaki et al. | 524/495 |

FOREIGN PATENT DOCUMENTS

| | | | |
|---|---|---|---|
| 64-50061 | 2/1989 | Japan . | |
| 6-19220 | 1/1994 | Japan . | |
| 06289657 | 10/1994 | Japan . | |
| 7-234551 | 9/1995 | Japan . | |
| WO94/17134 | 8/1994 | WIPO | 524/495 |

*Primary Examiner*—Veronica P. Hoke
*Attorney, Agent, or Firm*—Nixon & Vanderhye

[57] ABSTRACT

A pigment composition for liquid toner comprising a carbon black, a resin and non-aqueous solvent, the carbon black and the resin being dissolved and dispersed in the non-aqueous solvent, and any one of (1) carbon black having a grit content of not more than 10 ppm and an ash content of not more than 0.1% by weight, (2) such carbon black that a value obtained by dividing a total amount of oxygen calculated from a composition of volatile components in carbon black at 1,500° C. by a specific surface area thereof, lies in the range of 0.20 to 0.40 mg/m$^2$, and (3) such carbon black that when extracted with monochlorobenzene, the content of polynuclear aromatic hydrocarbons in the extract is not more than 30 ppm, being used as the carbon black. The composition is produced by kneading the pigment and the resin together, freeze-pulverizing the mixture and then dissolving and dispersing the resultant particles in the non-aqueous solvent. This pigment composition is useful for liquid toners capable of exhibiting a good image properties having a sufficient print density. It has no influence on human body even when inhaled or ingested.

7 Claims, 4 Drawing Sheets

PIGMENT COMPOSITION FOR LIQUID TONER

DESCRIPTION

1. Technical Field

The present invention relates to a pigment composition for liquid toner, a process for producing the pigment composition and a process for producing the liquid toner.

2. Background Art

The printing speed of a wet-type electrophotographic printing system is inferior to that of a commercially available offset printing press, but in general, is far superior to that of a dry-type copying machine. Besides, unlike the commercially available offset printing press, the wet-type electrophotographic printing system can provide a print having an image quality as high as that of a photograph (resolution: 800 DIP or more) at a reduced printing cost without replacement of printing plates.

In the above-mentioned wet-type electrophotographic printing system, the development of images is conducted by using a so-called liquid toner. This liquid toner primarily is comprises an electrically insulating liquid and pigment fine particles dispersed therein. More specifically, the liquid toner comprises an electrically insulating carrier liquid (having an electrical resistance of $10^9$ to $10^{15}$ Ω/cm), coloring particles dispersed in the carrier liquid, a resin soluble in the electrically insulating liquid, a charge controlling agent for charging the coloring particles to positive or negative potential, and various additives. As the pigment fine particles, there have been used carbon black and various non-black pigments. Incidentally, the above-mentioned resin has been used for the purpose of dispersing or fixing the coloring particles.

Meanwhile, in general, in the case of carbon black, the inclusion of impurities (so-called grits) comprising mainly metals or the like and having a particle diameter of not less than 44 μm cannot be avoided in view of its production method. The commercially available carbon blacks have contained at least 50 ppm of such grits. The above-mentioned grits result from coke particles produced in an oven simultaneously with the production of carbon black, or chips or spalls of brick, and from a heat exchanger.

However, in case where such carbon black containing a large amount of grits or ash is used in the liquid toner, there have been caused not only damage to a photosensitive member but also non-uniformity in dot configuration in prints. For this reason, in the above-mentioned liquid toners. Therefore, it is one of important problems to use strictly selected carbon black containing less amount of grits or ash.

Further, in case where the liquid toners has the low zeta (ζ) potential, there have been caused insufficient print density or non-uniformity in dot configuration. For this reason, it is one of important problems how to solve it.

Meanwhile, in the case of conventional liquid toners, when raw materials therefor are handled in the production process, or when the wet-type electrophotographic printers using these toners are repaired or inspected, there have been discussions concerning influence on a human body caused when carbon black or carbon black-containing toner is erroneously inhaled or sucked by the operators, or concerning environmental pollution. Accordingly, it has been demanded to provide safe carbon black which causes no significant influence on human body even when inhaled or sucked. In addition, when pigment is not sufficiently dispersed in the liquid toner, there have been caused problems such as insufficient print density or non-uniformity in dot configuration. For this reason, it is also an important problem how to disperse the pigment in the toner in a good condition.

Further, in the case where the liquid toners contain insufficiently dispersed masses produced mainly in a dispersion step of the pigment, or impurities or foreign substances incorporated mainly in the toner production step, there arise various problems including not only deterioration in resolving power, image density or image properties, e.g., occurrence of fogs, but also damage to a surface of the photosensitive member. Therefore, it is also one of important problems how to completely prevent these coarse particles from being incorporated in the liquid toner.

Furthermore, although the liquid toners have advantages such as excellent resolving power because of small toner particle diameters, they are deteriorated in fixing property. Besides, when the high concentration toner liquid is used for a long period of time while being replenished, there has been caused such a disadvantage that the image quality is considerably deteriorated due to the change in concentration of the resin dissolved in the electrically insulating liquid.

In order to eliminate the above-mentioned disadvantages, there has been proposed a liquid toner prepared by dispersing pigment and resin particles comprising a pigment and a resin substantially insoluble in an electrically insulating liquid at normal temperature, in the electrically insulating liquid. As the method for the production of the above-mentioned resin particles, there has been known a phase separation method of separating the particles from an organic solution by using the temperature difference therebetween, in addition to a polymerization method. However, in any of the above-mentioned methods, various additive particles including coloring materials such as pigments tend to be coagulated upon deposition of the resin. As a result, toner properties and image quality are apt to be deteriorated due to insufficient dispersion of the additive particles in the resin particles.

It is an object of the present invention to provide a pigment composition for a liquid toner, which can exhibit good image properties.

It is another object of the present invention to provide a pigment composition for a liquid toner, which can exhibit good image properties with a sufficient print density.

It is a further object of the present invention to provide a pigment composition for a liquid toner, which is free from adverse influence on a human body even when inhaled or sucked, and has excellent image properties.

It is a still further object of the present invention to provide a process for producing a pigment composition for a liquid toner, which is free from insufficient print density and non-uniformity in dot configuration, and can be held in a good dispersing condition.

It is a still further object of the present invention to provide a process for producing a pigment composition for a liquid toner, which can exhibit good image properties.

It is a still further object of the present invention to provide a process for producing a liquid toner which can exhibit enhanced dispersibility of additive particles in resin particles, thereby improving toner properties and image quality.

DISCLOSURE OF THE INVENTION

Figure 1:
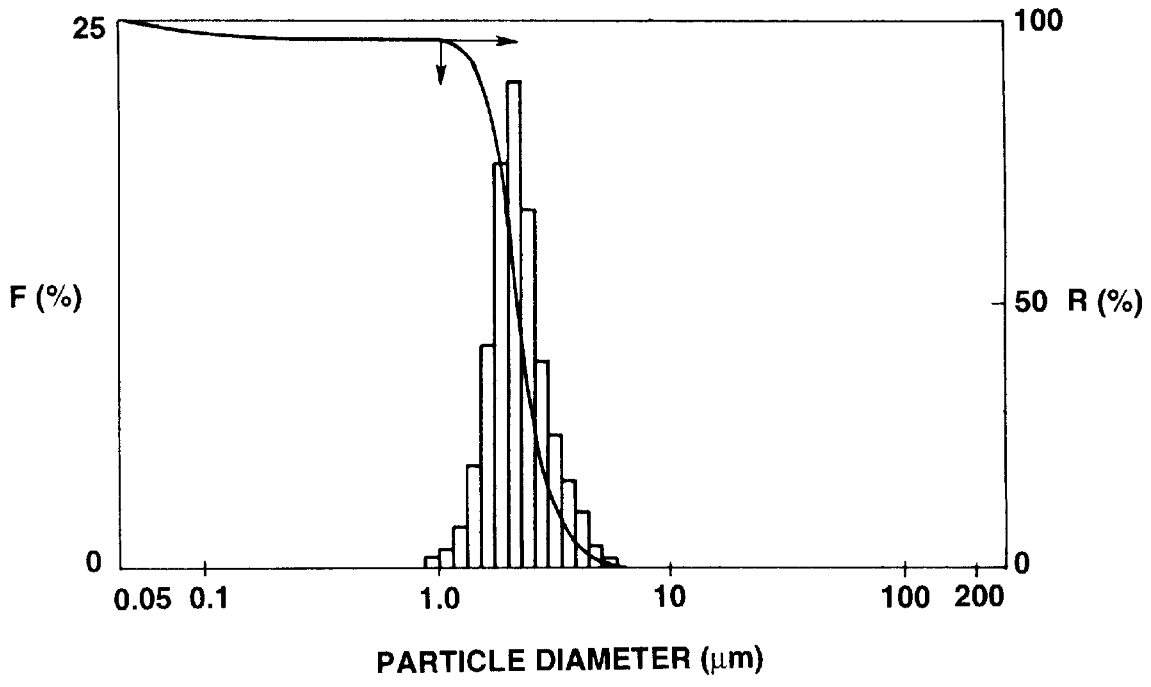
FIG. 1 is a view showing a particle diameter (size) distribution of a liquid toner obtained in Example 1 according to the present invention.

The above-mentioned various objects of the present invention can be accomplished by pigment compositions for a liquid toner, processes for the production of pigment compositions for liquid toner and process for the production of the liquid toner, as described in the below-mentioned items (1) to (6).

(1) A pigment composition for a liquid toner, comprising a carbon black, a resin and non-aqueous solvent, the carbon black and the resin being dissolved and dispersed in the non-aqueous solvent, and the carbon black having a grit content of not more than 10 ppm and an ash content of not more than 0.1% by weight.

(2) A pigment composition for a liquid toner, comprising a carbon black, a resin and non-aqueous solvent, the carbon black and the resin being dissolved and dispersed in the non-aqueous solvent, and such carbon black that a value calculated by dividing a total amount of oxygen obtained from a composition of volatile components generated therefrom at 1,500° C. by a specific surface area thereof, being in the range of 0.20 to 0.40 mg/$m^2$.

(3) A pigment composition for a liquid toner, comprising a carbon black, a resin and non-aqueous solvent, the carbon black and the resin being dissolved and dispersed in the non-aqueous solvent, and the content of polynuclear aromatic hydrocarbons in the extract being not more than 30 ppm when extracted with monochlorobenzene.

(4) A process for producing a pigment composition for a liquid toner, containing a pigment and a resin, which process comprises kneading the pigment and the resin together, freeze-pulverizing, and then dissolving and dispersing in a non-aqueous solvent.

(5) A process for producing a pigment composition for a liquid toner which comprises the pigment composition for a liquid toner containing a pigment and a resin which are dissolved and dispersed in a non-aqueous solvent capable of dissolving the resin, and has a solid content of not less than 5% by weight, which process comprises separating and removing coarse particles having a maximum length of not less than 5 μm from the pigment composition for a liquid toner at the temperature at which the resin can be substantially completely dissolved in the non-aqueous solvent, or higher.

(6) A process for producing a liquid toner which comprises toner particles comprising as main components a pigment and a resin and being dispersed in a carrier liquid, which process comprises:

using a pigment composition prepared by kneading the pigment and the resin together, freeze-pulverizing, and dissolving and dispersing in a non-aqueous solvent; and preparing the liquid toner by dispersing the toner particles containing as main components the pigment and the resin in the carrier liquid.

One of the production processes according to the present invention is a process for producing a pigment composition for a liquid toner containing a pigment and a resin. The process comprises kneading the pigment and the resin together, freeze-pulverizing, and then dissolving or dispersing in a non-aqueous solvent. By conducting such a production method, there can be obtained the pigment composition for the liquid toner, which is free from insufficient print density and non-uniformity in configuration of dots, and can be held in a good dispersing condition. Hereinafter, this production process is referred to as "production process A".

As the above-mentioned pigments, there may be used various pigments generally known as those for ink and toner. That is, as black pigments, there may be exemplified various carbon blacks. Specific examples of the carbon blacks may include all of commercially available carbon blacks for rubbers, for color-printing or for impartment of an electrical conductivity, which may be produced by a furnace method, a contact method, an acetylene method or the like.

More specifically, as the carbon blacks there may be exemplified HCF, MCF, RCF, LCF and LFF (products obtained by the furnace method) and HCC, MCC, RCC and LCC (products obtained by a channel method) according to the classifications described (on pages 290 to 291) in "Handbook of Carbon Black" published on April, 1995; various acetylene blacks described on page 294 of the same Handbook; or the like.

The preferred carbon blacks have an average particle diameter of 10 to 100 nm, a DBP (dibutyl phthalate) oil absorption of 40 to 300 ml/100 g, a specific surface area of 20 to 1,000 $m^2$/g and a pH of 2.0 to 10.0. The especially preferred carbon blacks have an average particle diameter of 20 to 50 nm, a DBP oil absorption of 50 to 150 ml/100 g, a specific surface area of 50 to 150 $m^2$/g and a pH of 2.0 to 6.0.

On the other hand, as non-black pigments, there may be exemplified phthalocyanine blue, phthalocyanine green, sky blue, rhodamine lake, malachite green lake, Hansa yellow, benzidine yellow, brilliant carmine 6B or the like.

The above-mentioned pigments can be used in combination with dyes. Examples of these dyes may include oil-soluble azo dyes such as oil black or oil red, basic azo dyes such as Bismarck brown, acid azo dyes such as blue black HF, quinoneimine dyes such as nigrosine, or the like. Further, there can be used dyes which are called processed pigments produced by coating surfaces of the above-mentioned pigments with a resin.

As the above-mentioned resins, thermoplastic resins are preferred. Examples of these thermoplastic resins may include a vinyl chloride resin, a vinylidene chloride resin, a vinyl acetate resin, a polyvinyl acetal resin, styrene-based resins, methacrylic acid-based resins, a polyethylene resin, a polypropylene resin, fluorine-based resins, polyamide-based resins, polyacetal resins, saturated polyester resins, or the like. The preferred thermoplastic resins are olefin-based resins containing a carboxyl group or an ester group. Specific examples of these olefin-based resins may include an ethylene/vinyl acetate copolymer, partially saponified products of the ethylene/vinyl acetate copolymer, ethylene/acrylic acid or methacrylic acid copolymers, ethylene/acrylate or methacrylate copolymers, acrylate or methacrylate resins, styrene/acrylic acid or methacrylic acid copolymers, styrene/acrylate or methacrylate copolymers, or the like. These resins can be used in the form of a mixture of any two or more thereof.

Further, the above-mentioned pigment composition for a liquid toner can further contain a charge controlling agent and/or a dispersant.

As the charge controlling agents, there may be exemplified various charge controlling agents conventionally used for controlling the charge of developers. Examples of the charge controlling agents may include nigrosine-based dyes, metallic soaps such as manganese naphthenate, calcium naphthenate, zirconium naphthenate, cobalt naphthenate, iron naphthenate, lead naphthenate, nickel naphthenate, chromium naphthenate, zinc naphthenate, magnesium naphthenate, manganese octylate, calcium octylate, zirconium octylate, iron octylate, lead octylate, cobalt octylate, chromium octylate, zinc octylate, magnesium octylate, manganese dodecylate, calcium dodecylate, zirconium dodecylate, iron dodecylate, lead dodecylate, cobalt dodecylate, nickel dodecylate, chromium dodecylate, zinc dodecylate or magnesium dodecylate, alkyl benzene sulfonates such as calcium dodecyl benzenesulfonate, sodium dodecyl benzenesulfonate or barium dodecyl benzenesulfonate, phospholipids such as lecithin or cephalin, organic amines such as n-decyl amine, or the like. These charge controlling agents can be used singly or in the form of a mixture of any two or more thereof.

The charge controlling agent may be added in a minimum amount sufficient to exhibit a charge controlling effect. However, the charge controlling agent may be added in an amount of usually 0.5 to 50% by weight, preferably 1 to 30% by weight based on the solid content in the liquid toner.

As the dispersants, surfactants to which ethylene oxide as a hydrophilic group is added, are preferred. As such dispersants, there may be exemplified phosphates of higher alcohol-ethylene oxide adducts which are classified into phosphates in anionic surfactants. In addition, as the nonionic surfactants, there may be exemplified higher alcohol-ethylene oxide adducts, alkyl phenol-ethylene oxide adducts, fatty acid-ethylene oxide adducts, polyhydric alcohol fatty ester-ethylene oxide adducts, higher alkyl amine-ethylene oxide adducts, fatty amide-ethylene oxide adducts, ethylene oxide adducts of fats and oils, polypropylene glycol-ethylene oxide adducts or the like. These dispersants can be used singly or in the form of a mixture of any two or more thereof.

The amount of the dispersant added is usually in the range of 0.5 to 80% by weight, preferably 1 to 50% by weight based on the solid content in the liquid toner.

In the production process A according to the present invention, the above-mentioned pigment and resin are first kneaded together. It is preferred that before the kneading, the resin is previously pulverized to prevent coarse particles from being incorporated therein. As a suitable method of kneading the resin and the pigment together, there may be exemplified a method comprising adding the charge controlling agent and/or the dispersant to a mixture of the resin and the pigment, treating the mixture in a mixer, and then treating the mixture in a kneader. As the mixers, there may be exemplified a Henschel mixer, a cooler mixer, a Naughter mixer, a drum mixer, a tumbler or the like. As the kneaders, there may be exemplified a Banbury mixer, a co-kneader, a twin roll mill, a three roll mill, a single screw extruder, a twin screw extruder or the like.

As the preferable mixing ratio of the resin to the pigment in the composition, the resin may be contained in an amount of 50 to 99.9% by weight, and the pigment may be contained in an amount of 50 to 0.1% by weight.

Next, the obtained kneaded mixture is freeze-pulverized. For example, after the kneaded mixture is sufficiently cooled with solid carbon dioxide (dry ice) or liquid nitrogen or in such an atmosphere through which these coolants are caused to be passed, the mixture is freeze-pulverized by a crusher into particles having a particle diameter of usually not more than 1,000 μm, preferably not more than 500 μm. As the crushers, there may be exemplified "Jet Mill" or Jet-O'Mizer manufactured by SEISHIN ENTERPRISE CO., LTD., "Counter Jet Mill" manufactured by HOSOKAWA MICRON CO., LTD., "Super Hammer Mill" manufactured by MEIJI KIKAI CO., LTD., or the like.

The purpose of the pulverization is to crush and comminute hard granular resin produced upon the kneading or undispersed masses of the pigment, and to pulverize a whole part of the kneaded mixture into fine particles to facilitate the dissolution and dispersion thereof in the non-aqueous solvent. The reason why the kneaded mixture is freeze-pulverized is such that since the kneaded mixture becomes hard and brittle by freezing, the pulverization efficiency can be increased and the particle diameter of the resultant particles is considerably decreased.

After the pulverization, the particles are classified by a classifier to obtain particles having a desired particle diameter and remove coarse particles therefrom. Such a classifying operation is preferred because the efficiencies of dissolution and dispersion to be conducted in the next step can be further increased. As the classifiers, there may be exemplified "Micron Separator" manufactured by HOSOKAWA MICRON CO., LTD., "Turbo Classifier" manufactured by NISSHIN ENGINEERING CO., LTD., "Micron Classifier" manufactured by SEISHIN ENTERPRISE CO., LTD., or the like.

Next, in the production process A according to the present invention, the above kneaded and pulverized mixture is dissolved and dispersed in the non-aqueous solvent. Examples of the non-aqueous solvents may include linear or branched aliphatic hydrocarbons, halogenated aliphatic hydrocarbons, aromatic hydrocarbons, aliphatic alcohols, ethers or the like.

Specific examples of the preferred non-aqueous solvents in which the resin cannot be dissolved, may include "ISOPER G", "ISOPER H", "ISOPER K", "ISOPER L", "ISOPER M" and "ISOPER V", all of which are produced by EXXON OIL CO., "SHELLSOL 71" produced by SHELL OIL COMPANY, "IP1620", "IP2028" and "IP2835", all of which are produced by IDEMITSU PETROCHEMICAL CO., LTD., or the like. On the other hand, specific examples of the preferred non-aqueous solvents which can dissolve the resin, may include benzene, toluene, methylethylketone, acetates, ethylether, tetrahydrofuran or the like. These non-aqueous solvents can be used singly or in the form of a mixture of any two or more thereof.

The mixing weight ratio between the non-aqueous solvent and the kneaded and pulverized mixture upon dispersing is such that the non-aqueous solvent is used in an amount of usually 3 to 8 parts by weight, preferably 4 to 7 parts by weight based on one part by weight of the kneaded and pulverized mixture.

The dispersing treatment is carried out in order to dissolve the resin in the non-aqueous solvent and reduce a viscosity of the resultant dispersion. Such dispersing treatment is preferably conducted by adding the kneaded and pulverized mixture as fine particles to the solvent heated to 60 to 80° C. and then lightly stirring to completely dissolve the resin in the solvent.

As the dispersing apparatuses, there can be preferably used a ball mill, a pebble mill, an attritor, a sand grinder (including both vertical and horizontal types) or the like. Among them, the sand grinders which are commercially available with tradenames "DAINOMILL" and "COBRAMILL".

The temperature of the solution upon the dispersing varies depending upon kinds of resins or solvents used, but is preferably in the range of about 60 to about 80° C. The dispersing treatment may be preferably conducted until it is determined by tracing the dispersing condition of the dispersion every hour by using a fineness-of-grind gauge or a microscope, that substantially no coagulated masses having a size of usually not less than 5 μm, preferably not less than 3 μm, are present in the dispersion.

Thereafter, a non-aqueous solvent is added to the obtained dispersion, if necessary, to adjust the pigment concentration thereof to a preferred value. Successively, the pigment resin particles are deposited by an ordinary method to obtain the aimed liquid toner.

Next, another process for the production of a pigment composition for a liquid toner according to the present invention, is explained. This production process comprises separating and removing coarse particles having a maximum length of not less than 5 μm from the pigment composition for a liquid toner contains a pigment and a resin which are dissolved and dispersed in a non-aqueous solvent capable of dissolving the resin, and has a solid content of not less than 5% by weight at the temperature at which the resin can be substantially completely dissolved in the non-aqueous solvent, or higher. By conducting such a production process, there can be obtained a pigment composition for a liquid toner which is capable of exhibiting good image properties or the like. Hereinafter, the production process is referred to as "production process B".

In the production process B according to the present invention, the same pigments, the same resins and the same non-aqueous solvents as described above may be used. In addition, if necessary, the same charge controlling agents and the same dispersants may also be used in the process.

The pigment composition containing the pigment and the resin dissolved and dispersed in the non-aqueous solvent capable of dissolving the resin, may be prepared, for example, by the following methods.

(i) After the pigment and the resin are kneaded together, the mixture is dissolved and dispersed in the non-aqueous solvent.

(ii) The solvent into which the resin is dissolved, is added to a water dispersion slurry containing the pigment and then stirred to transfer the pigment into the solvent. Thereafter, water or both water and the solvent are separated from the slurry, and if necessary, a non-aqueous solvent is added thereto to dissolve and disperse the pigment in the non-aqueous solvent.

The method (i) is entirely the same as the above-mentioned production process A.

In the case where the method (ii) is conducted, the resin is dissolved in the solvent, and then the resultant resin solution is added to the water dispersion slurry containing the pigment.

As the solvents, there can be used any of water-soluble or water-insoluble solvents as far as the resin can be dissolved therein. Examples of the water-soluble solvents may include acetates, acetone, cyclohexanone, nitromethane, methylethylketone, ethylether, methylether or the like. Examples of the water-insoluble solvents may include toluene, xylene, benzene, chloroform or the like.

The water dispersion slurry containing the pigment may be in the form of a homogeneous suspension prepared by adding the pigment to water and stirring the mixture. The content of the pigment in the slurry is preferably in the range of 0.1 to 10% by weight.

When the water dispersion slurry containing the pigment is stirred after adding the resin solution thereto, the mixture can be separated into two phases, i.e., a resin phase and a water phase. In this case, the content of the pigment in the slurry is in the range of usually 100 to 800 parts by weight, preferably 200 to 600 parts by weight based on 100 parts by weight of the resin.

The pigment is first present mainly in the water phase. However, when the stirring operation is further continued, the pigment is transferred into the resin phase. After the pigment is transferred into the resin phase, water or both water and the solvent are removed from the mixture system, thereby obtaining a composition containing the pigment and the resin.

Then, the thus obtained composition containing the pigment and the resin is dissolved and dispersed in the non-aqueous solvent. The amount of the non-aqueous solvent used is so adjusted that the solid content in the resultant dispersion is not less than 5% by weight.

In the production process B according to the present invention, it is required that coarse particles having a maximum length of not less than 5 μm are separated and removed from the above-prepared pigment composition for a liquid toner, at the temperature at which the resin is substantially completely dissolved in the non-aqueous solvent, or higher.

The temperature used for the separation and removal operations is varied depending upon kinds of the resins and the non-aqueous solvents used, but usually in the range of about 40° C. to about 100° C. As apparatuses used for the separation and removal, there can be used, for example, "KORO-FILTER" (manufactured by TOHBU SEISAKUSHO CO., LTD.), "AIR-FINEX" (manufactured by FUJI POWDAL CO., LTD.), "ULTRASONIC FILTER" (manufactured by MITSUBISHI CHEMICAL CORPORATION) or the like. When such separation and removal operations are conducted, undispersed or undissolved masses having a size of not less than 5 μm, and other impurities such as coarse particles can be removed from the dispersion.

Thereafter, the non-aqueous solvent is added to the thus obtained dispersion, if necessary, to adjust the pigment concentration thereof to a preferred value, and then the pigment and resin particles are deposited by an ordinary method to obtain the aimed liquid toner.

Next, a pigment composition for a toner according to the present invention is explained.

The pigment composition for a toner according to the present invention comprises carbon black, a resin and a non-aqueous solvent, the carbon black and the resin being dissolved and dispersed in the non-aqueous solvent. In the composition, there can be used the same pigments, the same resins and the same non-aqueous solvents as described above. In addition, the same charge controlling agents and the same dispersants as described above can also be used, if necessary.

One of the pigment compositions according to the present invention comprises carbon black containing grits (impurities having a particle diameter of not less than 44 μm) in an amount of not more than 10 ppm and ash in an amount of not more than 0.1% by weight, used as the carbon black for the pigment composition. By using such a pigment composition, there can be provided a pigment composition for a liquid toner, which is capable of exhibiting good image properties.

In the case where carbon black having a grit content of more than 10 ppm is used, surfaces of a photosensitive member and a transfer roller which are regarded as the heart of a wet electrophotographic printer, may be likely to be severely damaged, thereby causing not only greasing but also non-uniformity in configuration of dots in prints.

Such carbon black having a grit content of not more than 10 ppm, preferably not more than 5 ppm, can be obtained by uniformly suspending carbon black particles having an average particle diameter of 10 to 100 nm, a DBP oil absorption of 40 to 300 ml/100 g, a specific surface area of 20 to 1,000 $m^2/g$ and a pH of 2 to 10 in water to form a slurry having a viscosity of 1 to 100 poises and treating the slurry by a wet vibrating sieve (see Japanese Patent Application Laid-Open (KOKAI) No. 56-11963) or a ultrasonic classifier (see Japanese Patent Application Laid-Open (KOKAI) No. 61-89262) to remove impurities having a particle diameter of not less than 44 $\mu$m therefrom.

As especially preferred carbon blacks, there may be exemplified such carbon blacks obtained by subjecting carbon black particles having an average particle diameter of 20 to 50 nm, a DBP oil absorption of 50 to 150 ml/100 g, a specific surface area of 50 to 150 $m^2/g$ and a pH of 2.0 to 6.0 to the same treatments as described above to adjust the grit content thereof to not more than 10 ppm, preferably not more than 5 ppm.

The grit content may be measured by a residue-on-sieve method "A" according to JIS K6221 (1970). Specifically, carbon black is slowly supplied into a 350-mesh sieve, and then water is fed into the sieve through a nozzle to wash carbon black. The washing is continued until the water passing through the sieve becomes transparent. The carbon black residue remaining on the sieve is dried at 105° C. for one hour, and then cooled. Thereafter, the weight of the residue is measured, and the amount of residue on the sieve (grit content) is calculated from the following formula. Incidentally, the measurement of the grit content is carried out by using 500 to 1,000 g of carbon black.

Grit Content=Residue on sieve (g)/Weight of carbon black (g)

Further, it is important that the carbon black used for the above-mentioned pigment composition has not only a grit content of not more than 10 ppm but also an ash content of not more than 0.1% by weight.

The ash has a composition containing alkali metals, alkali earth metals, salts and oxides of these metals or the like. Accordingly, when the carbon black having an ash content of more than 0.1% by weight is used, the electrical conductivity of the liquid toner is increased, thereby forming non-uniform and unstable electrostatic images on the surface of photosensitive member. As a result, it becomes impossible to obtain images having a high toner density.

In addition, alkali ion substances contained in the ash are absorbed by the toner particles, so that the charge controlling agent is inhibited from being absorbed by the toner particles, thereby causing the zeta ($\zeta$) potential to be decreased. As a result, edges between printing area and non-printing area become unclear and loose, resulting in not only deterioration in resolution or definition of images but also formation of so-called "drowsy images".

The reduction in ash content can be achieved by appropriately selecting raw oils used upon the production of carbon black, spray water used upon quenching, additives or the like. Also, the reduction in ash content can be achieved by washing carbon black yielded from the production furnace with water or acid. Further, the reduction in ash content can be achieved by the combination of the above-mentioned selection of the raw materials upon the production of carbon black, the spray water, the additives or the like, and the above-mentioned water- or acid-washing.

The ash content in carbon black is expressed in terms of such an amount of the residue generated when carbon black is calcined in air at 750° C. for 4 to 6 hours.

Next, another pigment composition according to the present invention is explained. In the pigment composition, such carbon black that a value calculated by dividing a total amount of oxygen obtained from a composition of volatile components generated therefrom at 1,500° C. by a specific surface area thereof, lies in the range of 0.20 to 0.40 $mg/m^2$, is used as the carbon black for the pigment composition. By using such a pigment composition, there is provided a pigment composition for a liquid toner, which is capable of exhibiting good imaging properties with a sufficient print density.

On surfaces of carbon black particles, there exist oxygen-containing functional groups such as a hydroxyl group, a carbonyl group or a carboxyl group. In the case where the resin or the like is mixed with carbon black, the electrical resistance of the mixture can be considerably varied depending upon amounts of the oxygen-containing functional groups contained.

In general, the amounts of the oxygen-containing functional groups may be measured by determining the composition of the volatile components. Specifically, the amount of the hydroxyl group or the carbonyl group can be determined by that of CO, and the amount of the carboxyl group can be determined by that of $CO_2$. The total amount of oxygen contained is a value calculated from the amounts of CO and $CO_2$.

The above-mentioned composition of the volatile components can be obtained in the following manner.

That is, a predetermined amount of dry carbon black is put into a heat-resistant sample tube whose inner pressure is then reduced up to $10^{-2}$ mmHg. Thereafter, the sample tube is placed in an electric furnace heated to 1,500° C., and volatile components are isolated from the carbon black for 30 minutes. All of the volatile components isolated are received in a tank and mixed together. Thereafter, the composition and amounts of the gases are measured by gas chromatography to calculate the ratio (weight ratio) of $CO_2$ to CO and the ratio of the total amount of oxygen to the specific surface area.

The specific surface area is measured by a BET method.

That is, by using a low-temperature nitrogen absorption apparatus "SOAPTMATIC 1800" (manufactured by CALRO ELBA CO., LTD., Italy), the amount of nitrogen absorbed by the carbon black is measured by a low-temperature nitrogen absorption method. Then, the specific surface area is calculated according to the BET equation by a multi-point method.

The total amount of oxygen obtained from the composition of the volatile components generated at 1,500° C. is divided by the specific surface area to calculate a total amount of oxygen per unit specific surface area. The attribute "total amount of oxygen per unit specific surface area" is prescribed for the following reasons.

In general, in the case where carbon black is oxidized by various methods, the amount of oxygen-containing functional groups added thereto becomes increased as the specific surface area of the carbon black is increased.

However, the properties of carbon black to which resin, rubber or the like is added, have a correlation with not an absolute amount of the oxygen-containing functional groups, but the number of the oxygen-containing functional groups per unit surface area. As a result of the studies thereon, it has been found that such an attribute is deeply concerned with the dispersing condition or the zeta ($\zeta$) potential of the liquid toner composition.

In the case where the ratio of the total amount of oxygen to the specific surface area of carbon black is less than 0.20

($mg/m^2$), although the dispersibility of the carbon black in resin when kneaded therewith at an elevated temperature is excellent, the carbon black exhibits deteriorated compatibility with the solvent used in the next dispersing step. As a result, a liquid toner having a good dispersing condition cannot be obtained, and further the specific resistance of the liquid toner tends to become lowered due to the low specific resistance of the carbon black itself.

On the other hand, in the case the ratio of the total amount of oxygen to the specific surface area of carbon black is more than 0.40 ($mg/m^2$), almost all the surface thereof is covered with the oxygen-containing functional groups, so that the compatibility thereof with the resin is deteriorated, and the resultant composition contains a large amount of undispersed carbon black masses. As a result, the liquid toner is deteriorated in print density.

The method for the production of carbon black is not particularly restricted, and any methods such as an oil furnace method, a gas furnace method or an acetylene thermal decomposition method may be used.

As the oil furnace method, there can be used, for example, a method described on pages 278 to 285 of "Handbook of Carbon Black" (published on Apr. 15, 1995 by Institute of Carbon Black). Carbon black whose ratio of the total amount of oxygen to the specific surface area is large can be obtained not only by an air oxidation method in which carbon black yielded from a production furnace is contacted and reacted with air in an elevated temperature atmosphere, but also by a method in which the carbon black is reacted with nitrogen oxides, ozone, hydrogen peroxide, nitric acid or the like at ordinary temperature.

Next, a further pigment composition according to the present invention is explained. The pigment composition comprises such carbon black that when extracted with monochlorobenzene, the content of polynuclear aromatic hydrocarbons in the extract is not more than 30 ppm, used as the carbon black for the pigment composition. By using such a pigment composition, there can be provided a pigment composition for liquid toner which has no influence on human body even when it is inhaled or sucked, and can exhibit excellent image properties.

The above-mentioned polynuclear aromatic hydrocarbons may generally include precursor substances produced during the reaction for the production of carbon black. As the main substances, there may be exemplified naphthalene, fluorene, fluoranthine, pyrene, chrysene, benzopyrene or the like. The total amount of these substances contained is regarded as the amount of the polynuclear aromatic hydrocarbon (PAH). The PAH is measured in the following manner.

First, 5 g of dry carbon black specimen is filled in a flask into which 180 ml of monochlorobenzene is previously received, and extracted therewith for 48 hours. Successively, the resultant extract is charged into an evaporator and concentrated at 55° C. until reaching a predetermined concentration. Thereafter, the obtained concentrate is analyzed by a liquid chromatography under the below-mentioned conditions.

Liquid chromatography: "LC-6A" (manufactured by SHIMAZU SEISAKUSHO CO., LTD.);

Flow controller: "SCL-6A" (manufactured by SHIMAZU SEISAKUSHO CO., LTD.);

Detector: "Waters 490E Type" (manufactured by MILLIPORE CO., LTD.);

Column: "ODS A, M Type" (manufactured by YAMAMURA KAGAKU CO., LTD.);

Amount supplied: 5 $\mu$l;

The PAH contained in carbon black is preferably not more than 10 ppm.

A variety of polynuclear aromatic hydrocarbons are oily substances. In the case where carbon black having a PAH of more than 30 ppm is mixed and kneaded with a resin in a high temperature atmosphere, the PAH components are oozed out on a surface of the carbon black, so that a skin layer is formed between the carbon black and the resin, thereby the dispersing condition being deteriorated because of causing such a composition containing a large amount of coagulated masses. Further, when such a composition is dissolved and dispersed in the non-aqueous solvent after the freeze-pulverization, a part of the coagulated masses still remains in the liquid. As a result, the aimed dispersion especially a liquid toner having a fine and uniform particle diameter cannot be obtained.

In addition, in the process for the production of toner, especially in operations for handling raw materials, such as processes for mixing or kneading carbon black with the resin, carbon black is disadvantageously scattered around. Accordingly, in many cases, the scattered carbon black is attached to cloths or bodies of operators, or inhaled or sucked by the operators.

Further, in wet electrophotographic printers in which the liquid toner is used, it can be expected that after a long stoppage of the printer, the liquid toner in the form of dry particles is deposited onto surfaces of a photosensitive member and various rollers thereof, thereby causing a risk that the toner in the form of particles is inhaled or sucked by operators for repair and maintenance.

In Chapter IV, Section 9 of "Handbook of Carbon Black" (third edition) published in 1995, with respect to influence of carbon black on human body, it is described that carbon black containing a large amount of solvent-extractable components such as polynuclear aromatic hydrocarbons is unfavorable from safe and hygienic viewpoints.

For these reasons, the carbon black containing a large amount of PAH components is not preferable as a raw material for liquid toner.

Carbon black containing less amount of the PAH components can be obtained by taking measures such as increase in temperature inside the production furnace or lengthening of the reaction time.

The above-mentioned pigment compositions according to the present invention can be produced by the production process described hereinbefore.

Next, the process for the production of a liquid toner according to the present invention is explained. The production process is a process for producing a liquid toner in which toner particles comprising primarily a pigment and a resin is dispersed in a carrier liquid. The production process comprises using such a pigment composition as formed by kneading the pigment and the resin together, freeze-pulverizing the kneaded mixture and then dissolving and dispersing the obtained particles in a non-aqueous solvent; and dispersing the toner particles comprising primarily the pigment and the resin in the carrier liquid to prepare a liquid toner. By conducting such a production process, there can be obtained a liquid toner which has an enhanced dispersibility of additive particles such as pigment in resin particles, thereby improving toner properties and image quality.

As the above-mentioned pigment composition, there can be used the same pigment compositions as described above. In the pigment composition, the resin is dissolved in the non-aqueous solvent (if necessary, under a heating condition). In this state, when the solubility of the resin in the solvent is decreased, the resin is deposited from the solvent.

The decrease in solubility of the resin can be achieved, for example, by using any one or more of the following methods.

(i) Method of removing at least a part of good solvent components to the resin, from the non-aqueous solvent in which the resin is dissolved.

(ii) Method of adding poor solvent components to the resin, to the non-aqueous solvent in which the resin is dissolved.

(iii) Method of cooling the non-aqueous solvent in which the resin is dissolved, for example up to room temperature.

In a preferred embodiment of the present invention, the pigment concentration can be adjusted to a preferred value by adding such a non-aqueous solvent which shows a temperature dependency with respect to its dissolving property relative to the resin and whose solubility parameter (SP value) is adjusted in order to optionally control a particle diameter of deposited pigment and resin particles. As the difference in SP value (ΔSP value) between the non-aqueous solvent and the resin is reduced, the particle diameter of the pigment and resin particles deposited in the subsequent deposition step can become smaller and the particle diameter distribution thereof can become sharper. From these standpoints, the above-mentioned ΔSP value is usually not more than 0.5, preferably not more than 0.3. The solvent used can be appropriately selected from the above-mentioned non-aqueous solvents. In addition, the solvent may be made of a single kind of solvent or a in the form of a mixed solvent. Further, if necessary, in addition to the resin, other additives such as a charge controlling agent or a dispersant can be added to the composition.

After the above-mentioned pigment-dispersed liquid mixture is heated to dissolve and disperse the pigment and resin particles, the solubility to the resin is decreased in such a manner as described above, whereby the pigment and resin particles (toner particles) having small particle diameters and sharp particle diameter distribution and exhibiting a good dispersibility of the pigment can be obtained without operations such as pulverization or classification of the toner particles.

In the case where the pigment composition according to the present invention is used, it becomes possible to prevent the pigment in the pigment and resin particles from being coagulated together. That is, in the pigment composition according to the present invention, the pigment and the resin are kneaded together to completely cover a surface of the pigment with the resin. For this reason, in the resin solution before deposition of the pigment and resin particles, the surface of the pigment has a strong affinity with resin molecules in the solvent, thereby obtaining the effect of preventing the pigment particles from being coagulated upon deposition of the resin. Further, since coarse particles are removed by the freeze-pulverization process conducted after kneading the pigment and the resin together, the next process for dissolving and dispersing the kneaded pigment and resin particles in the non-aqueous solvent can be conducted with a high efficiency, and the pigment particles can be effectively prevented from being coagulated again.

Furthermore, by controlling the SP value of the non-aqueous solvent upon deposition of the particles, the affinity between the solvent and the resin can be varied. As a result, it becomes possible to optionally change particles diameters of the deposited pigment and resin particles. Especially, since the affinity between the resin and the solvent becomes stronger and the dispersibility of the resin-coated pigment particles is further improved as the difference in SP value therebetween (ΔSP value) is decreased, the pigment and resin particles having small particle diameters and sharp particle diameter distribution and exhibiting a good dispersibility of the pigment in the particles can be deposited.

BEST MODE FOR CARRYING OUT THE INVENTION

The present invention is described in more detail below by way of examples. In these examples, "part(s)" and % represents "part(s) by weight" and "% by weight", respectively. Incidentally, the properties and image quality with respect to the liquid toner were evaluated in the following manner.

(1) Particle diameter of toner

Measured by a laser diffraction/scattering-type granulometer LA-700 manufactured by HORIBA SEISAKUSHO CO., LTD. and represented as 50% by volume particle diameter.

(2) Zeta (ζ) potential

Measured by a laser zeta (ζ) potential gauge "LEZA-600" manufactured by OHTSUKA DENSHI CO., LTD.

(3) Image quality

Images were printed on a coated paper by using MITSUBISHI electroprinting system, and visually observed to evaluate an image quality thereof.

(4) Image density

Measured by a Macbeth densitometer.

EXAMPLES 1 TO 2 AND COMPARATIVE EXAMPLES 1 TO 2

2,400 g of a partially saponified ethylene/vinyl acetate copolymer ("DUMIRAN C-2280" produced by TAKEDA YAKUHIN CO., LTD.), 600 g of carbon black ("MA-11" produced by MITSUBISHI CHEMICAL CORPORATION), 30 g of nigrosine ("BONTRON N-09" produced by ORIENT KAGAKU CO., LTD.) and 300 g of a surfactant ("MRB-8" produced by DAIICHI KOGYO SEIYAKU CO., LTD.) were charged into a super mixer ("SMV-20 type" manufactured by KAWATA CO., LTD.) having a capacity of 20 liters, and mixed together at 2,000 rpm for 5 minutes.

Next, the resultant mixture was kneaded by a twin screw extruder ("TEM-35B" manufactured by TOSHIBA KIKAI CO., LTD.) whose maximum temperature was set to 150° C. Thereafter, the kneaded mixture was cut into pieces having a diameter of about 1 to about 2 mm by a strand cutter, thereby obtaining kneaded pellets.

Next, the above-obtained pellets were immersed in liquid nitrogen and sufficiently cooled. Then, the pellets were pulverized by a jet mill ("STJ-200" manufactured by SEISHIN ENTERPRISE CO., LTD.). The obtained pulverized product was dried in a vacuum dryer whose temperature was set to 70° C., for 10 hours. The average particle diameter of the thus obtained pulverized product was 120 μm.

Next, 2,550 g of a mixed solution (SP value: 9.18) composed of 48% of "ISOPER G" (produced by ESSO OIL CO.), 32% of toluene (produced by KATAYAMA KAGAKU CO., LTD.) and 20% of ethanol (produced by KATAYAMA KAGAKU CO., LTD.), and 450 g of the above-obtained pulverized product were charged into a stainless steel container, and gradually heated to 70° C. while stirring at 100 rpm. While maintaining the temperature of the content at 70° C., the pulverized product was dissolved in the mixed solution for 30 minutes.

Next, the resultant solution maintained at 70° C. was fed into "DAINOMILL" having a kneading capacity of 1.4 liters ("KDL-Pilot Type" marketed by SHINMARU ENTERPRISE CO., LTD.) at a flow rate of 3.5 liters per minute, and then intimately dispersed for 3 hours.

A part of the resultant dispersion was applied onto a glass plate to form a thin film thereon, and the thin film of the dispersion was observed with respect to a dispersing condition thereof by an optical microscope (magnification: ×400). As a result, it was confirmed that the dispersion contained no coagulated masses having diameters of not less than 1 μm.

Next, 2.0 parts of the above-obtained dispersion, 150 parts of the above mixed solvent, 0.24 part of the above surfactant "MRB-8" and 0.4 part of the above "DUMIRAN C-2280" were charged into a container equipped with a stirrer, a thermometer and a reflux condenser, and then the content was stirred at 70° C. for 30 minutes to completely dissolve the "DUMIRAN C-2280". Thereafter, the resultant liquid was allowed to stand at room temperature and cooled up to 30° C. to deposit pigment and resin particles. The mixed solvent of the dispersion containing the deposited pigment and resin particles was replaced with "ISOPER G", and zirconium naphthenate as a charge controlling agent was added to the dispersion to obtain a positively charged liquid toner. The results of evaluations for the toner are shown in Table 1. In addition, the particle diameter distribution of the toner is shown in FIG. 1.

EXAMPLE 2

Figure 2:
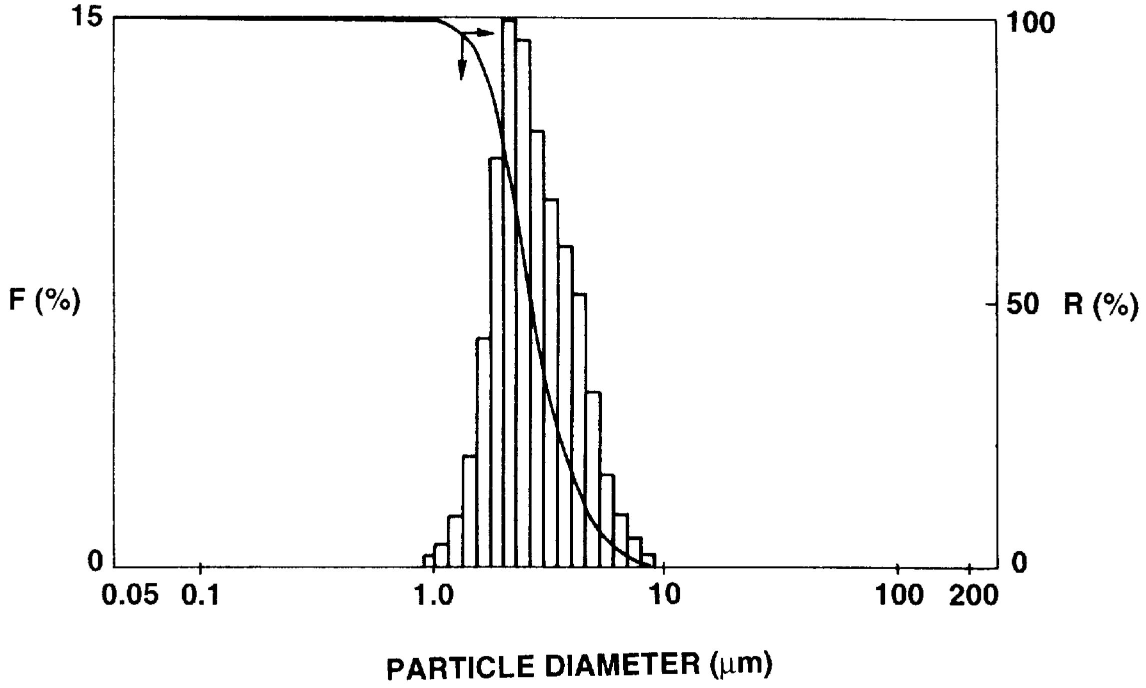
FIG. 2 is a view showing a particle diameter (size) distribution of a liquid toner obtained in Example 2 according to the present invention.

The same procedure as defined in Example 1 was conducted except that phthalocyanine blue (produced by DAINICHI SEIKA CO., LTD.) was used instead of carbon black, and the addition of nigrosine was omitted, thereby producing a positively charged liquid toner. The results of evaluations for the toner are shown in Table 1. The particle diameter distribution of the toner is shown in FIG. 2.

COMPARATIVE EXAMPLE 1

Figure 3:
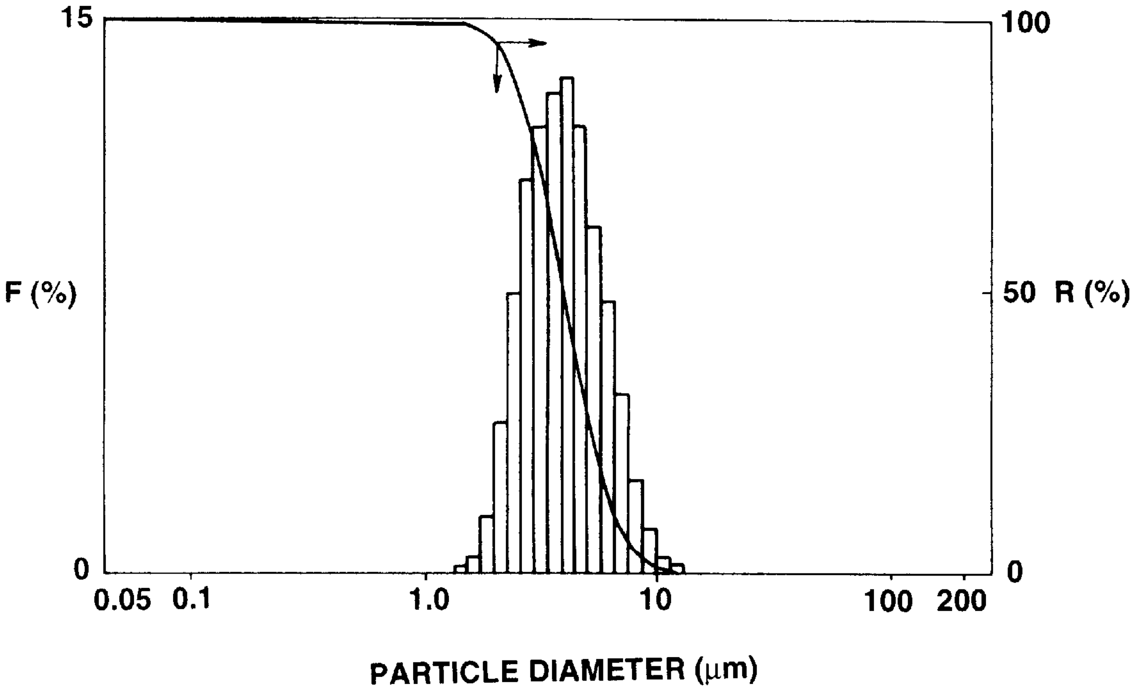
FIG. 3 is a view showing a particle diameter (size) distribution of a liquid toner obtained in Comparative Example 1.

The same procedure as defined in Example 1 was conducted except that the freeze-pulverization of the pellets obtained by kneading by a twin screw kneader was omitted, thereby producing a positively charged liquid toner. The results of evaluations for the toner are shown in Table 1. The particle diameter distribution of the toner is shown in FIG. 3.

COMPARATIVE EXAMPLE 2

The same procedure as defined in Example 1 was conducted except that the pellets (having an average particle diameter of 1.5 mm) obtained by kneading by a twin screw kneader was cooled with liquid nitrogen and then pulverized by "SAMPLE MILL TYPE KII" manufactured by FUJI POWDAL CO., LTD., thereby producing a positively charged liquid toner. Incidentally, the particle diameters of the pulverized product were within the range of 0.1 to 0.9 mm. The results of evaluations for the toner are shown in Table 1.

TABLE 1

| | Example 1 | Example 2 | Comp. Example 1 | Comp. Example 2 |
|---|---|---|---|---|
| Dispersing condition of dispersion (visually observed by a microscope (× 400)) | Excellent | Excellent | Bad | Not good |
| Particle diameter of toner (median diameter) (μm) | 2.12 | 2.55 | 3.94 | 3.23 |
| Zeta (x) potential (mV) | +80 | +77 | +78 | +78 |
| Image density (D) | 2.1 | 1.6 | 1.7 | 1.8 |
| Configuration of dots (visually observed) | Sharp | Sharp | slightly blurred at edges | slightly blurred at edges |
| Total evaluation of image quality (visually observed) | Excellent | Excellent | Not good | Not good |

EXAMPLE 3

The same procedure as defined in Example 1 was conducted except that the liquid dissolving the pulverized pellets were dispersed by "DAINOMILL", and then filtered by an ultrasonic filtering apparatus to remove undispersed masses or undissolved substances therefrom, thereby producing a positively charged liquid toner. The filtering was conducted under the below-mentioned conditions. The results of the evaluations for the positively charged liquid toner are shown in Table 2.

<Filtering conditions>

Ultrasonic frequency: 20 KHz;

Diameter of ultrasonic chip: ϕ26 mm;

Oscillation power per unit area of ultrasonic oscillation: 22.6 Watt/$cm^2$;

Diameter of cylindrical portion of filter: 80 mm;

Sieve opening of filter: 5 μm; and

Amount of carbon black slurry supplied: 5 ml/min.

TABLE 2

| | Example 3 |
|---|---|
| Dispersing condition of dispersion (visually observed by a microscope (× 400)) | Excellent |
| Particle diameter of toner (median diameter) (μm) | 2.08 |
| Zeta (x) potential (mV) | +81 |
| Image density (D) | 2.2 |
| Configuration of dots (visually observed) | Sharp |
| non-uniformity of image density | 2.1 ± 0.01 |
| Total evaluation of image quality (visually observed) | Excellent |

EXAMPLE 4

The same procedure as defined in Example 1 was conducted except that the carbon black obtained by the below-mentioned method was used, thereby producing a positively charged liquid toner.

That is, the method used for the production of the carbon black was identical to ordinary oil furnace method. In the method, ethylene bottom oil containing less amounts of Na, Ca and S was used as a raw oil, and coke oven gas was used as a combustion gas. Further, pure water treated with an ion exchange resin was used as a reaction-terminating water. The obtained carbon black was added to pure water, and forcibly stirred by a suspending-type T.K. homomixer (manufactured by TOKUSHU KIKA-KOGYO CO., LTD.) to prepare a homogeneous suspension containing 1 to 2% by weight of carbon black. After the viscosity of the suspension was determined, the suspension was treated with a vibrating sieve to which a 500-mesh metal net having a diameter of 50 cm was attached. Successively, a predetermined amount of toluene was added to the filtered suspension, and then the mixture was stirred to transfer the carbon black to the toluene phase and simultaneously conduct the granulation thereof. Thereafter, the carbon black was filtered and separated from water, and heated to a temperature of 100 to 200° C. to remove toluene and water from the carbon black, followed by measurements of the grit content, the ash content, the DBP oil absorption, the specific surface area or the like. The properties of the thus obtained carbon black (A1) are shown in Table 3. The results of the evaluations for the obtained positively charged liquid toner are shown in Table 4.

EXAMPLES 5 AND COMPARATIVE EXAMPLES 3 to 4

The same procedure as defined in Example 1 was conducted except that each of carbon blacks having grades shown in Table 3 was used, thereby producing a positively charged liquid toner. The results of evaluations for the toner are shown in Table 4.

TABLE 3

| | Properties of carbon black | | | |
|---|---|---|---|---|
| | A1 | A2 | B1 | B2 |
| Average particle diameter (nm) | 29 | 25 | 29 | 25 |
| DBP oil absorption (1/100 g) | 65 | 58 | 66 | 60 |
| Specific surface area ($m^2/g$) | 105 | 135 | 107 | 137 |
| Grit content (ppm) | 1 | 0 | 89 | 67 |
| Ash content (% by weight) | 0.03 | 0.05 | 0.15 | 0.67 |

TABLE 4

| | Example 4 | Example 5 | Comp. Example 3 | Comp. Example 4 |
|---|---|---|---|---|
| Kind of carbon black | A1 | A2 | B1 | B2 |
| Zeta (x) potential (mV) | +85 | +90 | +53 | +40 |
| Conductivity of liquid (s/cm) | $7.2 \times 10^{-12}$ | $6.5 \times 10^{-12}$ | $1.3 \times 10^{-11}$ | $1.5 \times 10^{-11}$ |
| Particle diameter of toner (median diameter) (μm) | 2.14 | 1.98 | 2.32 | 2.10 |
| Print density (D) | 2.0 | 2.2 | 1.7 | 1.8 |
| Configuration of dots | Sharp | Sharp | Blurred at edges | Blurred at edges |
| Stains (D) after printing on 100,000 sheets (A4) | Not more than 0.01 | Not more than 0.01 | 0.35 | 0.28 |
| Drowsy images | None | None | Occurred | Occurred |
| Total evaluation | Excellent | Excellent | Bad | Bad |

EXAMPLES 6 TO 8 AND COMPARATIVE EXAMPLES 5 TO 6

The same procedure as defined in Example 1 was conducted except that each of carbon blacks having grades shown in Table 5 (A3 to A5 and B3 to B4) was used, thereby producing a positively charged liquid toner. The results of evaluations for the toners are shown in Table 6.

The above carbon blacks were produced in the following manner.

That is, the method used for the production of the carbon black was identical to ordinary oil furnace method. In the method, ethylene bottom oil containing less amounts of Na, Ca and S was used as a raw oil, and coke oven gas was used as a combustion gas. Further, pure water treated with an ion exchange resin was used as a reaction-terminating water. 500 g of the obtained carbon black was charged into a cylindrical kiln having an inner diameter of 50 cm and a length of 100 cm. While rotating the kiln at 25 rpm, a mixed gas composed of air and $NO_2$ gas (concentration of $NO_2$: 12,000 ppm) was passed through the kiln, thereby treating carbon black A3 for 16 hours, carbon black A4 for 12 hours, carbon black A5 for 19 hours, carbon black B3 for 8 hours and carbon black B4 for 24 hours, with the mixed gas. Successively, these carbon blacks treated were charged into separate external heating type kilns and heat-treated therein at 200° C. for 30 minutes while feeding air through the respective kilns. After completely cooling, the carbon blacks were taken out of the respective kilns to obtain samples to be evaluated.

TABLE 5

| | Properties of carbon black | | | | |
|---|---|---|---|---|---|
| | A3 | A4 | A5 | B3 | B4 |
| Specific surface area ($m^2/g$) | 108 | 108 | 106 | 107 | 101 |
| DBP oil absorption (ml/100 g) | 61 | 59 | 55 | 57 | 53 |
| Total amount of oxygen (mg/g) | 30.0 | 22.2 | 38.2 | 15.1 | 46.5 |
| Total amount of oxygen/ specific surface area ($mg/m^2$) | 0.28 | 0.21 | 0.36 | 0.46 | |

TABLE 6

| | Example 6 | Example 7 | Example 8 |
|---|---|---|---|
| Kind of carbon black | A3 | A4 | A5 |
| Toner particle diameter (μm) | 2.32 | 2.26 | 2.74 |
| Zeta (x) potential (mV) | +92 | +84 | +98 |
| Liquid specific resistance (W-cm) | $1.1 \times 10^{11}$ | $1.3 \times 10^{11}$ | $1.2 \times 10^{11}$ |
| Viscosity (cp) | 310 | 330 | 305 |
| Print Density (D) | 2.0 | 2.1 | 2.0 |
| Reproducibility of gradation (visually observed) | Excellent | Good | Excellent |

TABLE 6-continued

| Total evaluation | Excellent | Good | Excellent |
|---|---|---|---|

| | Comp. Example 5 | Comp. Example 6 |
|---|---|---|
| Kind of carbon black | B3 | B4 |
| Toner particle diameter (μm) | 2.41 | 5.49 |
| Zeta (x) potential (mV) | +67 | +100 |
| Liquid specific resistance (W-cm) | $5.9 \times 10^{10}$ | $1.4 \times 10^{11}$ |
| Viscosity (cp) | 480 | 275 |
| Print Density (D) | 1.8 | 1.6 |
| Reproducibility of gradation (visually observed) | Bad | Not good |
| Total evaluation | Bad | Bad |

EXAMPLES 9 TO 10 AND COMPARATIVE EXAMPLES 7 TO 8

The same procedure as defined in Example 1 was conducted except that each of carbon blacks having grades shown in Table 7 (A6 to A7 and B5 to B6) was used, thereby producing a positively charged liquid toner. The results of evaluations for the toners are shown in Table 8.

TABLE 7

| | Properties of carbon black | | | |
|---|---|---|---|---|
| | A6 | A7 | B5 | B6 |
| Specific surface area ($m^2/g$) | 101 | 43 | 112 | 48 |
| PAH (ppm) | 4.7 | 8.5 | 58 | 34 |

TABLE 8

| | Example 9 | Example 10 | Comp. Example 7 | Comp. Example 8 |
|---|---|---|---|---|
| Kind of carbon black | A6 | A7 | B5 | B6 |
| Dispersibility of pigment | ○ | ◎ | Δ | Δ |
| Toner particle diameter (median diameter) (μm) | 2.12 | 1.95 | 2.25 | 2.24 |
| Print Density (D) | 2.2 | 2.0 | 1.7 | 1.6 |
| Configuration of dots (visually observed) | Sharp | Sharp | Slightly blurred at edges | Slightly blurred at edges |
| Total evaluation | Excellent | Good | Not good | Not good |

EXAMPLE 11

Figure 4:
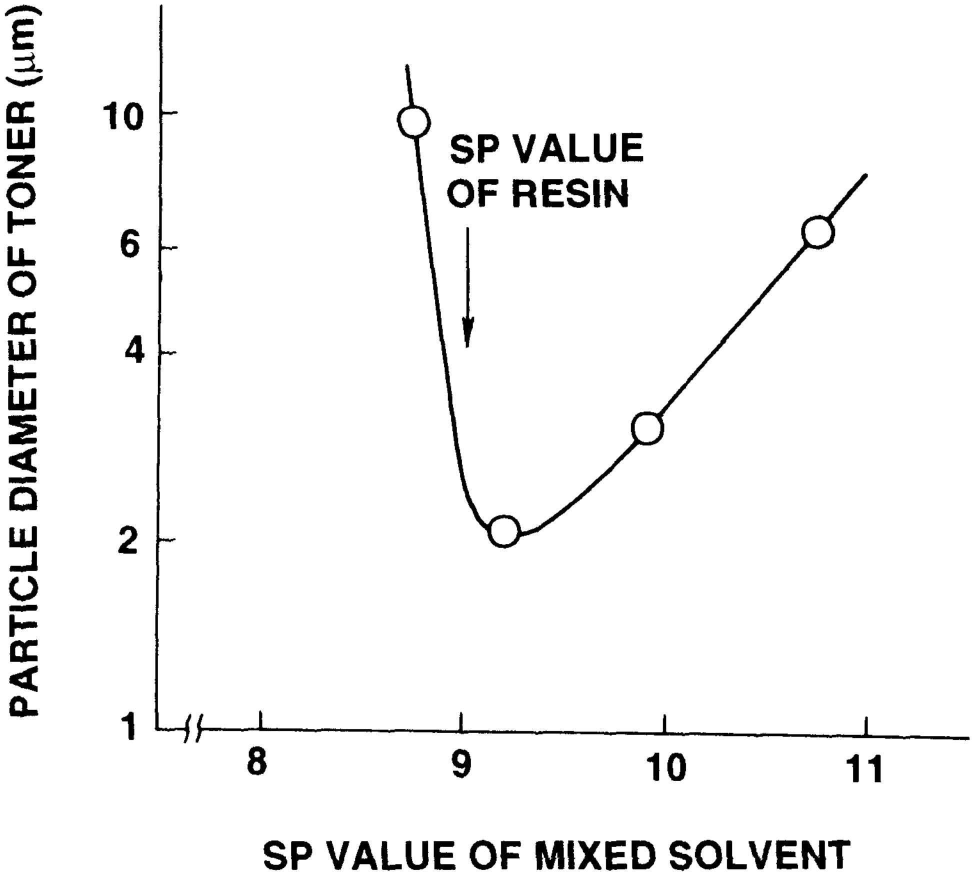
FIG. 4 is a view showing a relationship between SP values of mixed solvents and particle diameters (sizes) of toners in Examples 1 and 11 according to the present invention.

The same procedure as defined in Example 1 was conducted except that the composition of the mixed solvent received in a container equipped with a stirrer, a thermometer and a reflux condenser was changed as indicated in Table 9 below to deposit pigment and resin particles, thereby producing a liquid toner, The particle diameters of the thus produced liquid toners are shown in Table 9. Further, the relationship between the SP values of the mixed solvents used and the particle diameters of the obtained toners are shown in FIG. 4. (Incidentally, the results of Example 1 are also shown in Table 9 and FIG. 4.)

TABLE 9

| | Mixing ratio in non-aqueous solvent (%) | | | |
|---|---|---|---|---|
| | Example 11(1) | Example 1 | Example 11(2) | Example 11(3) |
| Kind of solvent | | | | |
| ISOPER (produced by EXXON CHEMICAL CO.) | 53 | 48 | 40 | 30 |
| Toluene (produced by KATAYAMA KAGAKU CO., LTD.) | 35 | 32 | 27 | 20 |
| Ethanol (produced by KATAYAMA KAGAKU CO., LTD.) | 12 | 20 | 33 | 50 |
| SP value of mixed solvent | 8.73 | 9.18 | 9.89 | 10.73 |
| Particle diameter of liquid toner (μm) | 9.7 | 2.1 | 3.1 | 6.6 |

As described above, in accordance with the present invention, the following effects can be achieved.

(1) There can be obtained a pigment composition for liquid toner capable of exhibiting good image properties, especially image properties with a sufficient print density.

(2) There can be obtained a pigment composition for liquid toner, which has less influence on human body even when inhaled or sucked, and is excellent in image properties.

(3) There can be obtained a pigment composition for liquid toner, which can exhibit a good dispersibility of the particles.

(4) Especially, in the process for the production of a liquid toner according to the present invention, since the additive particles to be dispersed in the carrier liquid, such as the pigment in the pigment and resin particles, can exhibit an excellent dispersibility in the carrier liquid, there can be obtained a liquid toner which is improved in toner properties and image quality, and further is able to produce images having a high optical density on a paper. Further, in the process for the production of the liquid toner according to the present invention, by controlling the SP values of the solvent used for depositing the pigment and resin particles, it becomes possible to optionally vary particle diameters of the pigment and resin particles. Especially, by using the resin and the solvent having substantially identical SP values, there can be obtained liquid toner particles having a small diameter and a sharp particle diameter distribution.

What is claimed is:

1. A pigment composition for a liquid toner, containing a carbon black in an amount of 50 to 0.1% by weight and a resin in an amount of 50% to 99.9% by weight, the carbon black and the resin dissolved and dispersed in a non-aqueous solvent and the solids content of the composition being at least 5% by weight, wherein the carbon black has a particle diameter in the range of 10 to 100 nm, a dibutyl phthalate (DBP) absorption of 40 to 300 ml/100 g, a specific surface area (BET) of 20 to 1000 $m^2/g$, a pH of 2.0 to 10.0, a grit content not more than 10 ppm, an ash content not more than 0.1% by weight, a polynuclear aromatic hydrocarbons (PAH) content of not more than 30 ppm, and having a total amount of oxygen per unit area of 0.20 to 0.40 $mg/m^2$ calculated by dividing a total amount of oxygen obtained from composition of volatile components generated therefrom at 1,500° C. by a specific surface area thereof.

2. A pigment composition according to claim 1, wherein said carbon black has an average particle diameter of 20 to 50 nm.

3. A pigment composition according to claim 1, wherein said carbon black has an oil absorption (DBP) of 50 to 150 ml/100 g.

4. A pigment composition according to claim 1, wherein said carbon black has a specific surface area of 50 to 150 $m^2/g$.

5. A pigment composition according to claim 1, wherein said carbon black has a pH of 2.0 to 6.0.

6. A pigment composition according to claim 1, wherein said carbon black has a polynuclear aromatic hydrocarbon (PAH) content of not more than 10 ppm.

7. A pigment composition according to claim 1, wherein said carbon black has a grit content of not more than 5 ppm and an ash content of not more than 0.1% by weight.

* * * * *